July 17, 1962
D. E. LAWSON
3,044,758
SEAT CONSTRUCTION
Filed May 18, 1960
2 Sheets-Sheet 1
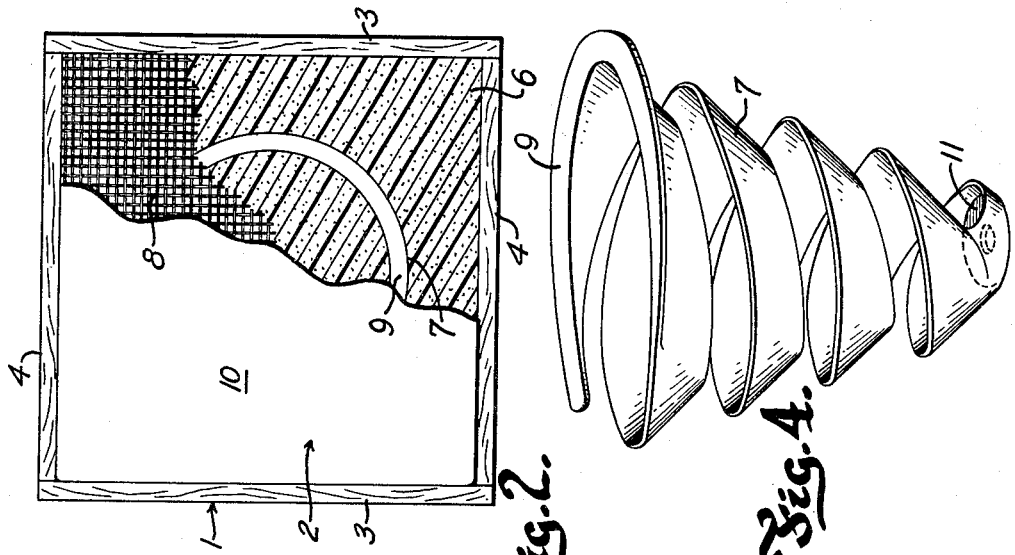
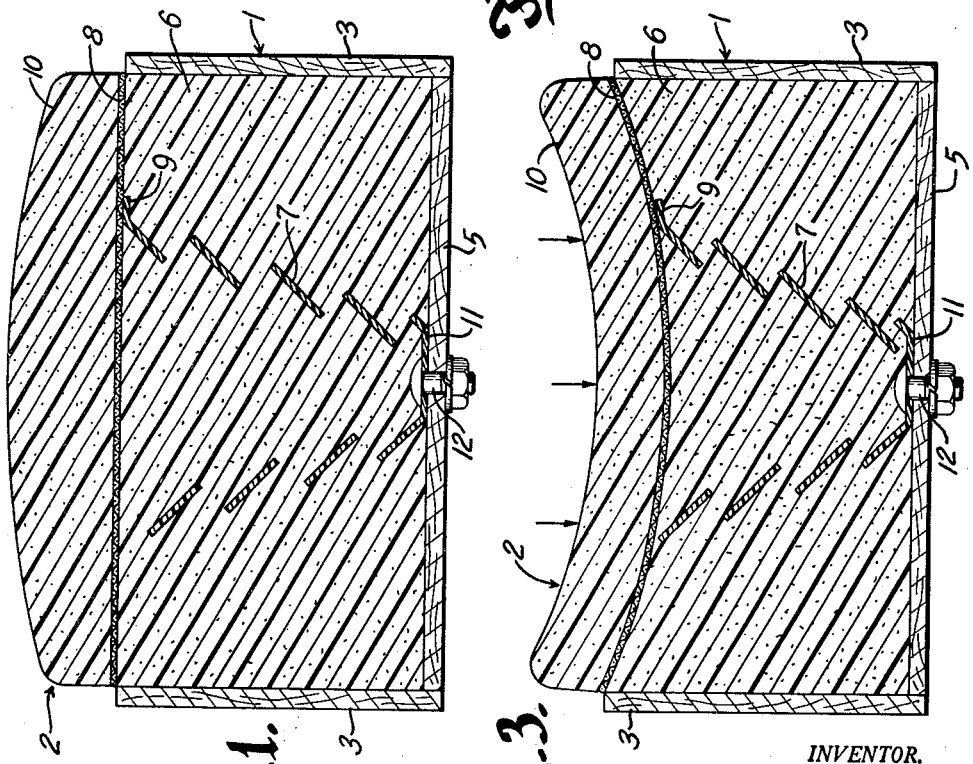
INVENTOR.
David E. Lawson
BY
Andrus & Starke
Attorneys July 17, 1962   D. E. LAWSON   3,044,758
SEAT CONSTRUCTION
Filed May 18, 1960   2 Sheets-Sheet 2
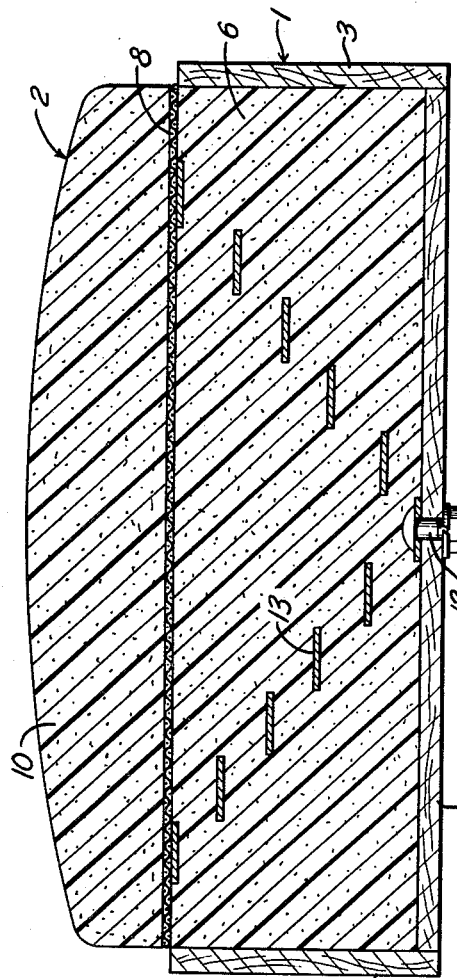
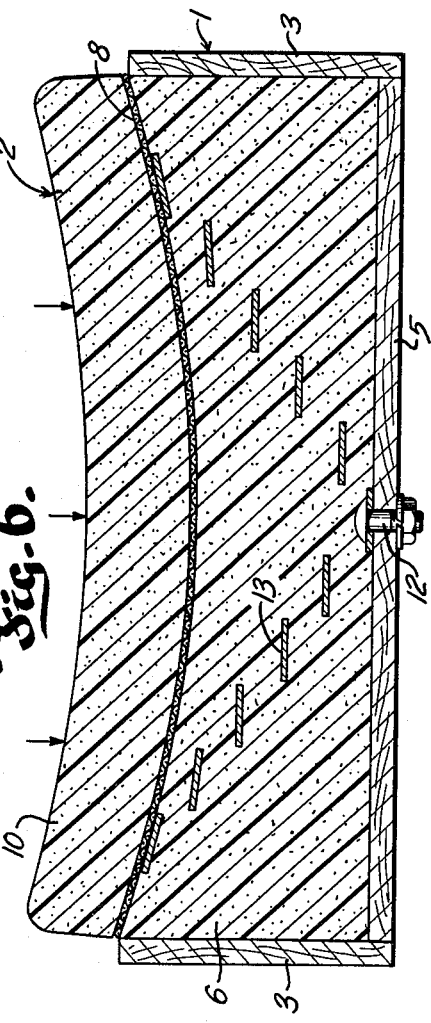
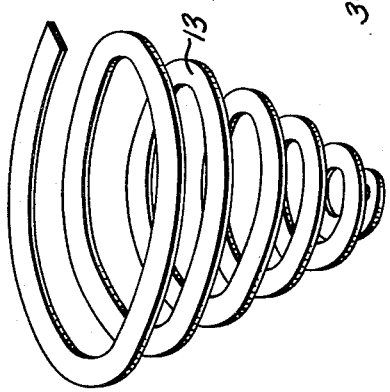
INVENTOR.
David E. Lawson
BY
Andrus & Starke
Attorneys

United States Patent Office 3,044,758
Patented July 17, 1962

3,044,758
SEAT CONSTRUCTION
David E. Lawson, 2021 Middleton Beach Road,
Middleton, Wis.
Filed May 18, 1960, Ser. 30,031
11 Claims. (Cl. 267—1)

This invention relates to a seat construction and more particularly to a foam plastic seat structure having a spiral reinforcement imbedded and bonded therein.

The usual seat structure includes an upper layer of foam rubber or plastic which is supported by a series of coil springs which rest on a support or base member. The layer of foam plastic provides the seat with a degree of softness to the touch, while the springs serve to support the load or weight of the person sitting on the seat. The base support for the springs may either take the form of a series of support bars, each of which supports a row of springs, or a single base plate which supports all of the springs. The assembly of the seat of this type and the tying of the springs is time consuming and requires a substantial amount of hand labor which substantially increases the cost of the seat.

The present invention is directed to a seat foam plastic structure in which the foam plastic is reinforced by a metal spiral. More specifically, a spiral-shaped, non-resilient reinforcing member formed of flat strip material is imbedded within and bonded to the foam plastic. The spiral is generally conical in shape and formed with a series of spaced turns or convolutions of progressively increasing diameter. The convolution of smallest diameter is disposed at the bottom of the seat structure and is connected to a support bar, while each convolution or turn vertically overlaps a portion of the next lower convolution. A sheet of fabric or wire mesh is disposed over the upper end of the spiral and is similarly imbedded within the foam plastic, and the layer of the plastic extending upwardly beyond the mesh provides a crown or cushion for the seat, providing softness to the touch.

The spiral is not a spring and has no resiliency but merely serves as a support or skeleton for the foam plastic material. When a load is imparted to the seat structure, the spiral will be compressed and the foam plastic located between the overlapping portions of the spaced convolutions is stretched. The resistance of the foam plastic to this stretching provides a degree of resiliency for the seat which is greater than the resilient foam plastic itself.

The seat construction of the invention is soft to the touch, yet provides firm support for a person sitting thereon. Due to the fact that no springs are included in the seat cushions, there are no lumps or hard spots in the seat.

The seat structure is economical to fabricate in that low cost materials are employed and the entire seat can be formed in a single casting operation which eliminates many of the hand labor operations which accompany the normal type of seat fabrication.

As the reinforcement is preferably in the shape of a conical spiral with the portion of smallest diameter disposed downwardly, the weight of the person sitting on the seat will be funneled downwardly to a single support point. This greatly simplifies the supporting structure and again reduces the overall cost of the seat construction.

Other objects and advantages will appear in the course of the following description.

The drawings illustrate the best mode presently contemplated of carrying out the invention.

In the drawings:

FIGURE 1 is a vertical section of the seat construction of the present invention;

FIG. 2 is a top view with parts broken away of the seat shown in FIGURE 1;

FIG. 3 is a view similar to FIGURE 1 showing the seat in the compressed position;

FIG. 4 is a perspective view of the reinforcing spiral employed in the seat construction;

FIG. 5 is a view similar to FIGURE 1 showing a modified form of the reinforcing spiral employed in the seat construction;

FIG. 6 is a view similar to FIG. 5 showing the seat construction in the compressed position; and FIG. 7 is a perspective view of the reinforcing spiral employed in the embodiment of FIG. 5.

The drawings illustrate a seat structure which comprises a frame 1 and a seat cushion 2 which is supported by the frame.

The frame 1 includes a pair of side walls 3 and a pair of end walls 4 which are connected at their ends to provide a generally rectangular support. In addition, a support bar 5, which can either be formed of wood or metal, is disposed between the end walls 4 and serves as a connection and support for the seat cushion 2.

The seat cushion 2 includes a body portion 6 formed of a foam plastic material which is reinforced by a spiral 7. In addition, a mesh 8 or web of fabric or metal is disposed over the upper end of the spiral 7 and the margin of the mesh extends outwardly to adjacent the periphery of the cushion 2.

The foam plastic material can be any of the conventional types, such as polyurethane, polyvinylchloride, polyethylene, polyester blends and the like.

The reinforcing spiral 7 is generally conical in shape with the end of smallest diameter being disposed at the bottom of the seat cushion 2. The spiral is formed from a generally flat strip of metal or reinforced plastic and each convolution or turn is spaced from the adjacent convolutions. The spiral is designed so that each convolution overlaps a portion of the adjacent lower convolution.

In addition, each turn or convolution is disposed at an acute angle to the axis of the spiral with the degree of angularity being generally in the range of 10° to 60° with respect to the horizontal. For most applications, the turns or convolutions are disposed at an angle of about 30° with respect to the horizontal.

The uppermost convolution of spiral 7 is provided with an outwardly extending rim 9 or flange and the mesh 8 rests on the flange. The flange itself serves to provide a greater area of support for a person sitting on the seat as well as preventing the spiral 7 from cutting through the mesh when the seat is compressed. The seat is formed so that the foam plastic extends a substantial distance upwardly beyond the mesh 8 to provide a cushion or crown 10 for the seat which provides a softness to the touch.

The lowermost convolution of the spiral terminates in a generally flat base 11 which rests on the support bar 5. A suitable bolt 12 or the like, serves to connect the spiral 7 to the support bar 5. The spiral 7 is not a resilient member and normally, if expanded, will fall back to the contracted position under its own weight. It is not intended that the spiral provide any degree of resiliency for the seat construction.

The foam plastic is bonded to the surfaces of the spiral and while the foam plastic has a relatively low compressive strength, it has a high tensile strength. The present invention takes advantage of the high tensile strength of the plastic material in that the portion of the foam plastic extending between the overlapping portions of the convolutions is stretched and subjected to tensile stress during compression of the seat cushion. This resistance to the tensile stress or stretching provides a degree of resiliency for the seat cushion which cannot be achieved by virtue of the foam plastic itself.

More specifically, when a person sits on the seat cushion, the seat is compressed, as shown in FIG. 3, and the portion of the foam plastic between the overlapping portions of adjacent convolutions is deformed and stretched. The resistance to this stretching or tensile stress of the plastic provides a degree of resiliency for the seat and provides a firm support which would not be obtainable with the extremely resilient foam plastic itself.

When subjected to load, the web 8 serves to distribute the force and serves to unify the compression of the sides of the spiral, or if a series of spirals are employed in a larger seat construction, it unifies the compression of all of the spirals. To provide the required overlap between adjacent turns or convolutions and obtain the desired stretching action of the plastic foam during compression of the seat, the strip material from which the spiral is made should generally have a width to thickness ratio in the range of 2:1 to 10:1 and generally in the range of about 7:1. If the spiral has a substantially circular cross sectional configuration or if the width and thickness are substantially equal, the stretching action will not be obtained and the turns, during compression, will tend to cut through the plastic material and destroy the bond therebetween and correspondingly destroy the action of the spiral.

The construction shown in FIGS. 5-7 is a modified form of the invention in which the spiral 13 used for the reinforcement or skeleton is formed of a generally flat strip of metal or plastic with the convolutions being disposed in planes that are generally perpendicular or normal to the axis of the spiral. As in the case of the first embodiment, the spiral 13 is not a resilient member and will normally not support its own weight. Each turn of the spiral vertically overlaps a portion of the next lower convolution as in the case of the spiral 7. Under load conditions, as shown in FIG. 6, the spiral is compressed and the foam plastic disposed between the overlapping portions of the convolutions is distorted and stretched. It is the resistance to this stretching and distortion which provides the support strength of the seat, with this resistance being many times greater because of the imbedded flat spiral than it would be in the case of a foam plastic material alone.

In fabricating the seat construction of the invention, the spiral and the mesh are located in a suitable mold having the shape of the finished seat and the foam plastic, then in a liquid condition, is poured or foamed into the mold. When the foam plastic sets, it adheres tightly to the convolutions of the spiral as well as to the mesh 8.

It is understood that one or more of the spirals may be imbedded in the foam plastic seat structure as, for instance, in an automobile cushion where two or three such spirals would ordinarily be utilized. Likewise, it will be apparent that the convolutions need not be arcuate or rounded, as shown, but may be of rectangular or oval configurations. Furthermore, while the above description is directed to a spiral having a series of turns or convolutions, it is contemplated that a series of separate rings could be employed in which case each ring would be disposed with respect to adjacent rings in a manner similar to which the convolutions of the spiral are located. The stretching and distortion of the foam plastic between the overlapping portions of adjacent rings would provide a function similar to that which results from using the spiral as described above.

This application is a continuation-in-part of application Serial No. 714,278, filed February 10, 1958, and entitled "Composite Seat Cushion," now abandoned.

Various modes of carrying out the invention are contemplated as being within the scope of the following claims particularly pointing out and distinctly claiming the subject matter which is regarded as the invention.

I claim:
1. A seat construction, comprising a frame having a base support member, a seat cushion mounted on the frame and supported by the support member, said seat cushion including a body of substantially resilient foam plastic material and a spiral reinforcement embedded within said body and bonded thereto, said spiral reinforcement being formed of a strip of material having a substantially greater width than thickness and being substantially free of resiliency, said spiral including a series of convolutions of progressively increasing diameter with the convolution of smallest diameter disposed downwardly, each of the convolutions being spaced from adjacent convolutions and vertically overlapping a portion of the next lower convolution, the portion of said foam plastic body disposed between said overlapping portions being subjected to stretching and tension stress when a load is applied to said seat cushion and the resistance of said foam plastic providing resiliency for said seat cushion, and means connecting the lowermost of said convolutions to said support member to thereby transfer the load to said support member.

2. A seat structure, comprising a spiral member formed of a strip of material substantially free of resiliency with said strip having opposite generally flat surfaces and the width of said strip being substantially greater than the thickness thereof, said spiral member having a series of convolutions of progressively increasing diameter with the convolution of smallest diameter disposed downwardly, each of the convolutions being spaced from adjacent convolutions and vertically overlapping a portion of the next lower convolution, and a surrounding body of substantially resilient foam plastic material bonded to the spiral member and disposed between the overlapping portions of the convolutions, the portion of said plastic material disposed between said overlapping portions being subjected to tension stresses when the load is imparted to the seat cushion and the resistance of the plastic material to said stresses providing resiliency for the seat cushion.

3. The structure of claim 2 in which each convolution of said strip is disposed at an angle of 10° to 60° with respect to a horizontal plane.

4. A seat structure, comprising a substantially flat strip of material disposed in the form of a helix and defining a series of vertically spaced turns of progressively increasing diameter with the turn of smallest diameter disposed downwardly, each turn of said strip being disposed at an acute angle to the vertical axis of the helix and vertically overlapping a portion of the next lower turn, and a surrounding body of foam plastic material surrounding the helix and bonded thereto, the portion of said foam plastic material disposed between said overlapping portions being subjected to distortion and stretching when a load is imparted to the seat cushion and the resistance of the plastic material to said distortion and stretching providing resiliency for the seat cushion.

5. A seat structure, comprising a substantially flat strip of material disposed in the form of a helix and defining a series of vertically spaced turns of progressively increasing diameter with the turn of smallest diameter disposed downwardly, said strip having the width to thickness ratio in the range of 2:1 to 10:1 and each turn of said strip being disposed to vertically overlap at least a portion of the next lower turn, and a surrounding body of foam plastic material surrounding the helix and bonded thereto, the portion of said foam plastic material disposed between said overlapping portions being subjected to distortion and stretching when a load is imparted to the seat cushion and the resistance of the plastic material to said distortion and stretching providing resiliency for the seat cushion.

6. The structure of claim 5 in which the width to thickness ratio of said strip is approximately 7:1.

7. A seat structure, comprising a frame having an open top and an open bottom, a support member secured to the frame and extending across the open bottom thereof, a cushion of foam plastic carried by the frame and supported on said support member with the upper portion of the cushion extending upwardly beyond the open top of the frame, a spiral member embedded within and bonded to said foam plastic cushion and formed of a strip of material substantially free of resiliency with said strip having opposite generally flat surfaces and the width of said strip being substantially greater than the thickness thereof, said spiral member having a series of convolutions of progressively increasing diameter with the convolution of smallest diameter disposed downwardly and secured to said support member, each of the convolutions being spaced from adjacent convolutions and vertically overlapping a portion of the next lower convolution, and a sheet of material of open construction disposed across the uppermost of the convolutions and embedded within the foam plastic cushion, the portion of the foam plastic disposed between said overlapping portions being subjected to tension stresses when the load is imparted to the seat cushion and the resistance of the foam plastic to said stresses providing resiliency for the seat cushion and said sheet serving to distribute the load and unify the compression of the spiral.

8. A load supporting structure, comprising a frame, a body of foam plastic supported on the frame, and reinforcing means substantially free of resiliency imbedded within said body and bonded to the foam plastic, said reinforcing means including a first section and a second section, said first section being spaced above said second section and at least partially vertically overlapping said second section, said first and second sections having a greater width than thickness and the portion of the foam plastic disposed between said overlapping sections being subjected to distortion and stretching when a load is imparted to said structure and the resistance of the plastic to said distortion and stretching providing resiliency for the structure.

9. A seat structure, comprising reinforcing means substantially free of resiliency and including a series of vertically spaced sections with each section having a progressively increased diameter with the section of smallest diameter disposed downwardly, each of said sections having opposite generally flat surfaces and the width of said sections being greater than the thickness thereof, each of the sections being spaced from adjacent sections and vertically overlapping a portion of the next lower section, and a surrounding body of substantially resilient foam plastic material bonded to said reinforcing means and disposed between the overlapping portions of the sections, the portion of said plastic material disposed between said overlapping sections being subjected to tension stresses when a load is imparted to the seat cushion, and the resistance of the plastic material to said stresses providing resiliency for the seat cushion.

10. A seat structure, comprising a spiral member formed of a strip of material substantially free of resiliency with said strip having opposite generally flat surfaces and the width of said strip being substantially greater than the thickness thereof, said spiral member having a series of convolutions of progressively increasing diameter with the convolution of smallest diameter disposed downwardly, each of said convolutions being spaced from adjacent convolutions, a cushion of substantially resilient foam plastic material bonded to the spiral member and disposed between the overlapping portions of the convolutions, and a sheet of reinforcing material disposed above said spiral and imbedded within said cushion, the portion of said cushion extending above said sheet having a substantial thickness and serving as a crown for the seat structure, the portion of said plastic material disposed between the overlapping portions of said convolutions being subjected to tension stresses when a load is imparted to the seat structure and the resistance of the plastic material to said stresses providing resiliency for the structure.

11. A load supporting structure comprising a frame, a body of foam plastic supported on the frame and having an upper load-supporting surface, and reinforcing means substantially free of resiliency imbedded within said body and bonded to the foam plastic, said reinforcing means including a first section and a second section with both said first and second sections being disposed at an acute angle to the horizontal, said first section being spaced above said second section and at least partially vertically overlapping said second section, said first and second sections having a greater width than thickness and a portion of the foam plastic disposed between said overlapping sections being subjected to distortion and stretching when a load is imparted to said structure and the resistance of the plastic to said distortion and stretching providing resiliency for the structure.

References Cited in the file of this patent

UNITED STATES PATENTS

| 16,972 | Foster et al. | Apr. 7, 1857 |
| 882,654 | Smith | Mar. 24, 1908 |
| 1,725,479 | Rissmann | Aug. 20, 1929 |
| 1,963,054 | Powers | June 12, 1934 |
| 2,398,237 | Marsack | Apr. 9, 1946 |
| 2,775,287 | Mantegna | Dec. 25, 1956 |
| 2,882,959 | Burkart | Apr. 21, 1959 |

FOREIGN PATENTS

| 508,271 | France | July 20, 1920 |
| 559,350 | France | Apr. 9, 1929 |
| 65,866 | Denmark | Nov. 10, 1947 |